UNITED STATES PATENT OFFICE.

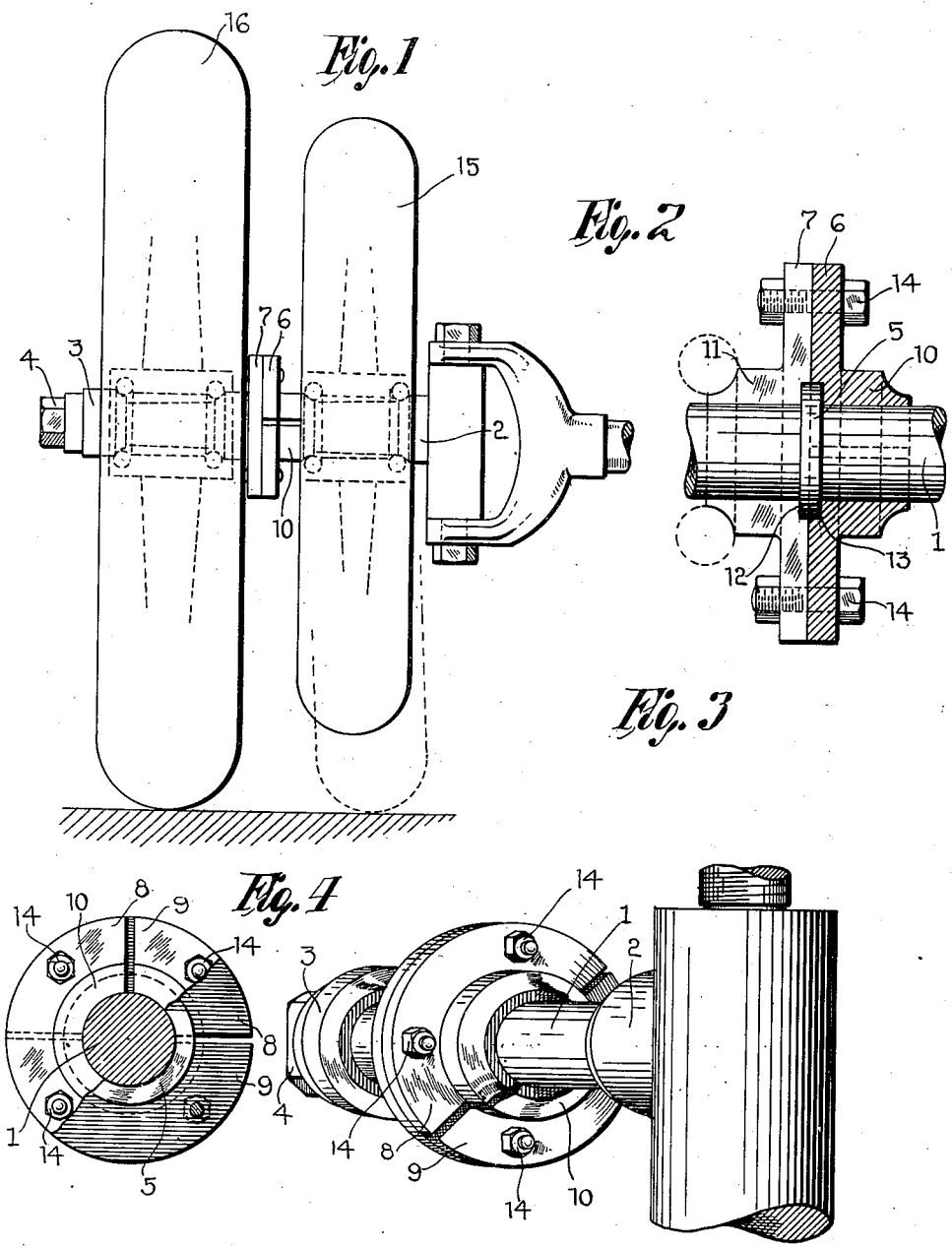

ERNEST LEGRAND ROBERTSON, OF GREENVILLE, SOUTH CAROLINA.

SAFETY APPLIANCE FOR AUTOMOBILES.

1,011,852. Specification of Letters Patent. Patented Dec. 12, 1911.

Application filed January 9, 1911. Serial No. 601,646.

*To all whom it may concern:*

Be it known that I, ERNEST L. ROBERTSON, a citizen of the United States, residing at Greenville, in the county of Greenville and State of South Carolina, have invented certain new and useful Improvements in Safety Appliances for Automobiles, of which the following is a specification, reference being had therein to the accompanying drawing.

This invention relates to vehicle wheels and the principal object of the same is to provide a means for attaching a principal wheel to the axle so that if the tire of the principal wheel becomes punctured, a supplemental wheel will take up the load and will save the punctured tire from becoming cut by the rim.

This invention is illustrated in the acompanying drawing, wherein—

Figure 1 is an elevational view of a wheel and axle and shows the supplemental wheel mounted upon the axle. Fig. 2 is an enlarged view of the collar which holds the wheels in spaced relation. Fig. 3 is a perspective view of the axle and shows a collar applied to the same. Fig. 4 is a sectional view through the axle, looking toward the collar, and part of the collar being broken away.

Referring to the accompanying drawings by numerals, it will be seen that this device is intended to be mounted upon the axle journal 1 which may be of any desired type but in the view shown is of the type generally used as a steering knuckle upon automobiles. A cone bearing 2 is formed at one end of the axle journal and a second detachable cone bearing 3 is placed upon the outer end of the axle journal and secured in place by means of the nut 4 or by any other suitable means. A collar 5 is formed upon the axle journal intermediate its length and forms a means for preventing the collars hereinafter set forth from slipping longitudinally upon the axle journal. The cone bearing collar comprises a pair of plates 6 and 7 each of which is made up of a pair of sections 8 and 9, which when placed together form a pair of circular plates. These plates are provided with bearings 10 and 11, which form opposite bearings to the bearings 2 and 3. The plates are provided in their inner faces with recesses 12 and 13 in which the collar 5 fits when the plates are secured upon the axle. It will be noted that when the plates are secured upon the axle, the sections are placed at right angles to each other as shown in Fig. 4 so that when the securing bolts 14 are passed through plates the sections of the plate 7 act as braces for the sections of the plate 6 and the sections of the plate 6 act as braces for the sections of the plate 7.

In assembling this device, the supplementary wheel 15 is placed upon the axle and its hub rests at one end upon the bearing 2. The sections of the plate 6 are then placed upon the axle and have their bearing 10 supporting the opposite end of the hub of the wheel 15, and have the one half of the collar 5 fitting into the recess 13 so that the plate securely holds the wheel in place and cannot move longitudinally upon the axle. The sections of the plate 7 are now placed around the axle with the remaining portion of the collar 5 fitting within the recess 12, and the plates secured together by the bolts 14. The wheel 16 is now placed upon the axle and has one end of its hub resting upon the bearing 11 and has the other end of its hub supported by the assembled bearing 3 which is held in place by the nut 4. If the tire of the wheel 16 becomes punctured the wheel 15 comes in contact with the ground and the weight of the machine is supported by the wheel 15 thus preventing the tire of the wheel 16 from getting what is called a rim cut, due to the rim of the wheel coming in contact with the ground.

It will be obvious that the supplemental wheel in the present invention is adapted to be used in case of emergency when any accident should occur to the wheel thereby allowing the operator to readily control the machine.

What I claim is:—

1. In a device of the character described, an axle, wheels mounted upon said axle, each of said wheels having a hub, plates mounted upon said axle between said wheels and secured together, bearings formed upon said plate to support the adjacent ends of said wheel hubs, whereby the wheels will be held in spaced relation, and means for retaining the outer one of said wheels in place.

2. In a device of the character described, an axle, a collar formed upon said axle between its ends, wheels mounted upon said axle at either side of said collar, a bearing formed upon the inner end of said axle, plates mounted upon said axle between said wheels and provided with recesses fitting said collar, means for holding said plates upon said collar, and a bearing mounted upon the outer end of said axle.

3. In a device of the character described, an axle, a collar formed upon said axle, wheels mounted upon said axle at either side of said collar and each having a hub, plates mounted upon said axle and surrounding said collar, said collar holding said plates against longitudinal movement upon said axle, bearings formed upon said plates to support the adjacent ends of the wheel hubs, a bearing formed upon the inner end of said axle, and a bearing removably mounted upon the outer end of said axle.

4. In a device of the character described, an axle, wheels mounted upon said axle, plates mounted upon said axle between said wheels, each of said plates comprising a plurality of sections, the sections of one of said plates being positioned at an angle to the sections of the other of said plates, means for removably holding said plates together, means for holding said plates against longitudinal movement upon said axle, and bearings at the inner and outer ends of said axle.

5. In a device of the character described, an axle, a bearing at the inner end of said axle, a collar formed between the ends of said axle, removable plates surrounding said collar, bearings formed upon said plates, said collar holding said plates against longitudinal movement upon said axle, a removable bearing at the outer end of said axle and means for holding the removable bearing in place.

In testimony whereof I hereunto affix my signature in presence of two witnesses.

ERNEST LEGRAND ROBERTSON.

Witnesses:
SAMUEL STRADLEY,
F. T. WALDEN.